United States Patent [19]

Terranova et al.

[11] 4,055,967
[45] Nov. 1, 1977

[54] AXIAL MOVEMENT LIMITING COUPLING ASSEMBLY

[75] Inventors: Carmen S. Terranova; Rustam B. Chinoy, both of Schenectady, N.Y.

[73] Assignee: General Electric Company, Schenectady, N.Y.

[21] Appl. No.: 614,522

[22] Filed: Sept. 18, 1975

[51] Int. Cl.² .............................................. F16D 9/00
[52] U.S. Cl. .......................................... 64/28 R; 64/8
[58] Field of Search ................ 64/28 R, 28 M; 403/2, 403/11, 337

[56] References Cited

U.S. PATENT DOCUMENTS

| 881,075 | 3/1908 | Hosking | 64/28 |
| 1,439,380 | 12/1922 | Ryding et al. | 64/28 |
| 2,739,463 | 3/1956 | Pfister et al. | 64/28 |
| 2,748,578 | 8/1956 | Potts | 403/2 |

FOREIGN PATENT DOCUMENTS 381,403  10/1932  United Kingdom ..................... 64/28

*Primary Examiner*—Samuel Scott
*Assistant Examiner*—Dick Turner
*Attorney, Agent, or Firm*—Herbert E. Messenger; John F. Ahern; James W. Mitchell

[57] ABSTRACT

A coupling assembly for two aligned rotating shafts connected together by shear bolts. The coupling assembly includes a casing which limits the axial movement of the shafts by engaging a surface of one of the shafts after shearing occurs and the connection between the shafts has been severed. The casing is connected to the shaft in a manner that forms a chamber for housing a lubricating fluid to ensure lubrication of the relatively moving parts of the coupling assembly after shearing occurs. A circumferential taper is provided on one of the shafts to cause the lubricating fluid to generate hydrodynamic pressure after shearing occurs.

2 Claims, 4 Drawing Figures

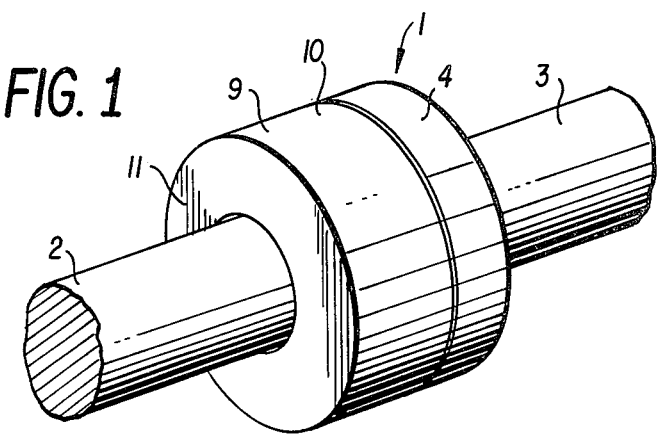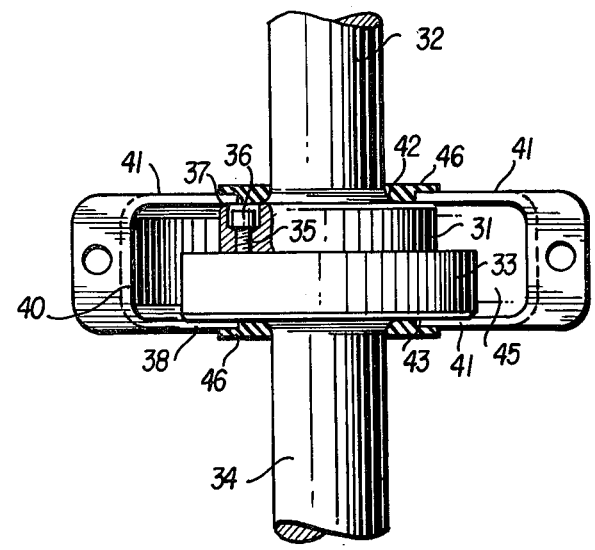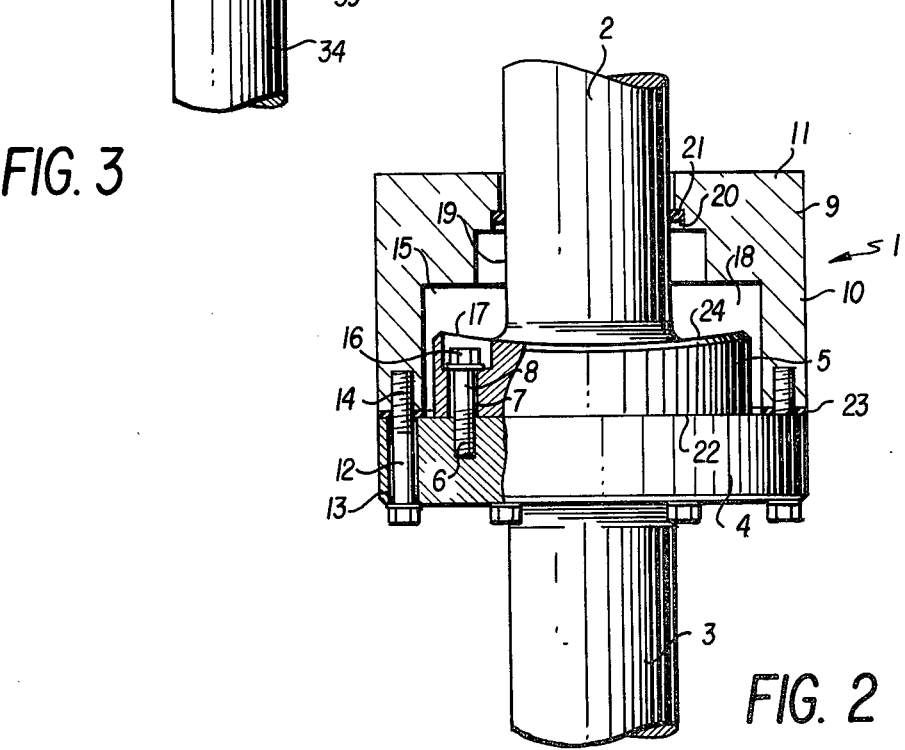

4,055,967

AXIAL MOVEMENT LIMITING COUPLING ASSEMBLY

BACKGROUND OF THE INVENTION

1. Field of the Invention

The invention relates to a coupling assembly for two rotating shafts.

2. Description of the Prior Art

In the use of rotating machinery it is usually necessary to employ a coupling assembly to connect the driver and the driven shafts of the machinery. Coupling assemblies are usually designed to operate with an axial load (thrust) and torque (transmitted power). If it is necessary to limit the torque on the driven shaft to prevent damage thereto, a shear coupling is usually employed, this coupling being designed to shear when a maximum level of torque has been exceeded. But, in existing devices employing shear couplings, after shearing has occurred, the axial movement of the driven shaft is limited in only one direction and the driven shaft can move freely in the other direction, thus potentially causing damage to the shaft and other parts of the machinery.

By the present invention, after shearing occurs, the axial movement of the driven shaft is limited in both directions, thereby preventing damage to the driven shaft and the other parts of the machinery.

Accordingly, an object of this invention is to provide a shear coupling assembly for two rotating shafts which coupling assembly rotates as a unit during normal operation and further limits relative axial movement of the two shafts should the coupling shear upon excessive torque.

A further object of this invention is to provide a coupling assembly including provision for preventing damage to the parts of the coupling assembly after shearing takes place.

A further object of this invention is to provide a coupling assembly including provision for retaining lubricant fluid in the coupling assembly and provision for generating hydrodynamic pressure in the coupling assembly after shearing has taken place.

SUMMARY OF THE INVENTION

The present invention is directed to a coupling assembly for a pair of aligned rotating shafts which are connected together by bolts that shear when a predetermined torque level is exceeded. The coupling assembly includes a casing which limits the axial movement of the driven shaft after shearing occurs. In one embodiment the casing is connected to the rotating shafts in a manner that allows the coupling assembly to house lubricating fluid. In addition, through the use of a circumferentially tapered flange, hydrodynamic pressure is generated to ensure proper lubrication. Counterbored holes in the flange or a counterbored ring in the casing are also used to prevent damage to the rotating parts of the coupling assembly after shearing has occurred and axial movement of the driven shaft is limited by the casing.

BRIEF DESCRIPTION OF THE DRAWINGS

FIG. 1 is a perspective view of the coupling assembly of the present invention.

FIG. 2 is a cross-sectional view of the coupling assembly in FIG. 1.

FIG. 3 is a perspective view of a modified embodiment of the present invention.

FIG. 4 is a sectional view of the modified embodiment in FIG. 3.

DESCRIPTION OF THE PREFERRED EMBODIMENTS

Referring to FIGS. 1 and 2, there is shown a coupling assembly 1 which includes a first shaft 2 referred to as the driven shaft and a second shaft 3 referred to as the driver shaft. The driver shaft 3 has a flanged portion 4. The driven shaft 2 also has a flanged portion 5. A first set of threaded openings, one of which is shown at 6, is provided in the flanged portion 4 of the driver shaft 3 in order to facilitate the connection of the flanged portion 4 of the driver shaft 3 to the flanged portion 5 of the driven shaft 2. A second set of openings 7 is provided in the flanged portion 5 of the driven shaft 2. The openings 7 are aligned with corresponding openings 6 in the flanged portion 4 of the driver shaft 3. In order to hold the two shafts in firm rotating engagement a plurality of shear bolts, one of which is shown at 8, are employed. These shear bolts 8 pass through the openings 7 in the flanged portion 5 of the driven shaft 2 into threaded engagement with openings 6 in the flanged portion 4 of the driver shaft 3. The shear bolts 8 are designed to shear and break the connection between the flanged portions 4 and 5 of the driver and driven shafts 3 and 2, respectively, when a predetermined maximum torque is exceeded, thereby preventing application of excessive torque which could damage the shafts.

In order to limit axial movement of the driven shaft should shearing occur, a casing 9 is provided. The casing 9 is a cup-shaped member having an axially extending portion 10 and an inwardly radially extending portion 11. The axially extending portion 10 is connected to the flanged portion 4 of the driver shaft 3 by a plurality of assembly bolts, one of which is shown at 12, which pass through openings 13 in the flanged portion 4 of the driver shaft 3 into engagement with threaded openings 14 in the axially extending portion 10 of the casing. The casing 9 has the same diameter as the diameter of the flanged portion 4 of the driver shaft 3. The radially extending portion 11 of the casing 9 extends over the flanged portion of the driven shaft 2 such that when shearing occurs and the driven shaft 2 moves axially, the inner surface 15 of the radially extending portion 11 of the casing 9 is engaged by the flanged portion 5 of the driven shaft 2 to limit the movement of the driven shaft 2.

In order to prevent damage to the casing 9 and the flanged portion 11 during such engagement, the openings 7 are counterbored to receive the heads 16 of bolts 8. The heads 16, therefore, do not project beyond the face 17 of the flanged portion 5 and damage which could otherwsie be caused by the engagement of the heads 8 with the inner surface 15 of the casing 9 is prevented.

The connection of the casing 9 and the flanged portion 4 of the driver shaft 3 form a chamber which serves as a reservoir 18 for oil or any other suitable lubrication fluid. The oil in the reservoir provides lubrication between the radially extending portion 11 of the casing 9 and the adjacent surface 19 of the driven shaft 2.

In order to prevent leakage of the oil from the chamber, a recess 20 is formed in the radially extending portion 11 of the casing 9 adjacent the driven shaft and a suitable sealing material 21 is provided therein. To further seal the reservoir at the abutting face 22 of the shafts, a gasket 23 is provided between the axially extending portion 10 of the casing 9 and the flanged portion 4 of the driver shaft 3.

In order to generate hydrodynamic pressure in the oil after shearing has occurred, to ensure lubrication of the relatively moving surfaces of the shafts and the adjacent surface of the radially extending portion 11 of the casing 9, a circumferential taper 24 is provided on the face 17 of the flanged portion 5 of the driven shaft 2. During rotation of the casing relative to the flanged portion 5, the circumferential taper 24 causes the flanged portion 5 to develop hydrodynamic pressure in the oil in the reservoir 18 and thereby assure supply of oil under pressure to area of the driven shaft 2 adjacent the radially extending portion 11 of the casing 9.

In operation, when torque in excess of the predetermined torque develops on the connection between the shafts 2 and 3, the shear bolts 8 break causing the connection between the driven shaft 2 and the driver shaft 3 to be severed. The severing of the connection allows the driven shaft 2 to move axially. However, this axial movement is limited by engagement of the face 17 of the flanged portion 5 with the inner surface 15 of the radially extending portion 11 of the casing 9. The axial movement of the driven shaft 2 in the opposite direction is limited by the flanged portion 4 of the driver shaft 3. The circumferential taper 24 on the face 17 of the flanged portion 5 of the driven shaft 2 pumps the oil in the reservoir 18 to generate hydrodynamic pressure to ensure lubrication of the relatively moving surface of the driven shaft 2 and the adjacent surface of the radially extending portion 11 of the casing 9.

Referring to FIGS. 3 and 4, there is shown a modified embodiment of the present invention. In this embodiment, the flanged portion 31 of the driven shaft 32 is connected to the flanged portion 33 of the driver shaft 34 in a manner similar to that in FIGS. 1 and 2 by a plurality of shear bolts, one of which is shown at 35, having their heads 36 disposed in counterbored holes 37 in the flanged portion 31 of the driven shaft 32. A casing 38, which is employed to limit the axial movement of the driven shaft 32 when shearing occurs, comprises two semi-annular members 39. Each semi-annular member 39 has an axially extending portion 40 and inwardly radially extending portion 41 extending from each end of the axially extending portion 40. One radially extending portion 41 of each member engages the face 42 of the flanged portion 31 of the driven shaft 32 and the other radially extending portion 41 of each member engages the face 43 of the flanged portion 33 of the driver shaft 34. The two semi-annular members 39 of the casing 38 are connected together by a plurality of bolts shown at 44. In this modification, the connection between the casing 38 and flanged portions 31 and 33 of the shafts 32 and 34 is such that when shearing occurs there is no axial movement of the driven shaft.

The connection between the radially extending portions 41 of the casing 38 and the flanged portions 31 and 33 of the shafts 32 and 34 also provide a chamber 45 for housing oil or any other suitable lubricating fluid. Seals 46 adjacent the radially extending portions 41 and the shafts 32 and 34 are provided to retain the lubricating fluid.

In operation, when torque in excess of the predetermined torque develops, the shear bolts 35 break causing the connection between the driver shaft 34 and the driven shaft 32 to be severed. However, because there is no axial space between the radially extending portions 41 of the casing 38 and the flanged portion 31 of the driven shaft 32, the casing 38 immediately restrains the axial movement of the driven shaft 32 and there is no relative axial movement of the shafts.

While specific embodiments of this invention have been shown and described, it is not intended that the invention be limited to these particular embodiments, and it is intended by the appended claims to cover all modifications within the spirit and scope of this invention.

We claim:

1. A coupling assembly for aligned first and second shafts comprising:
    a. flanged portions on each of said shafts, said flanged portions having openings therein;
    b. a plurality of shear bolts receivable in said openings for joining the flanged portions of the shafts together;
    c. a casing having an axially extending portion abutting the flanged portion of said first shaft and a radially extending portion surrounding said second shaft;
    d. a plurality of assembly bolts engaging said axially extending portion of said casing for assembling said casing to the flanged portion of said first shaft; and
    e. means for retaining lubricating fluid within said coupling assembly, said means comprising a chamber formed between said casing and the flanged portion of said first shaft, a gasket disposed between said axially extending portion of said casing and the flanged portion of said first shaft, and a seal disposed between said radially extending portion of said casing and said second shaft.

2. A coupling assembly defined in claim 1, wherein said flanged portion of said second shaft includes a circumferential taper for generating hydrodynamic pressure in said lubricating fluid after shearing occurs.

* * * * *